United States Patent [19]

Milberger et al.

[11] 3,760,285

[45] Sept. 18, 1973

[54] HIGH SPEED PULSER

[75] Inventors: Walter E. Milberger, Serverna Park; George W. Massing, Glen Burnie; Charles M. Allen, Jessups, all of Md.

[73] Assignee: Westinghouse Electric Corporation, Pittsburgh, Pa.

[22] Filed: July 11, 1972

[21] Appl. No.: 270,776

[52] U.S. Cl. .......................... 328/232, 332/7, 332/13
[51] Int. Cl. .......................... H03c 1/28
[58] Field of Search .......................... 332/7, 13; 331/6, 331/84; 328/232

[56] References Cited

UNITED STATES PATENTS

| | | | |
|---|---|---|---|
| 2,863,090 | 12/1958 | Young et al. | 332/13 X |
| 3,098,980 | 7/1963 | Dodington | 332/7 |
| 3,300,735 | 1/1967 | Badger | 332/13 X |
| 3,339,146 | 8/1967 | Gorski et al. | 332/7 X |
| 3,636,476 | 1/1972 | Milberg | 332/7 |

*Primary Examiner*—Alfred L. Brody
*Attorney*—F. H. Henson et al.

[57] ABSTRACT

A hybrid combination of transistors and vacuum tubes for controlling the conduction of high frequency tubes such as klystrons and the like in respone to the resonant charging and discharging of the klystron's grid capacitance. A pair of mutually opposite conductive vacuum tube switches alternately operate to resonantly charge and discharge the tube capacitance through an inductance in response to a first trigger signal applied to turn the tube "on" and to a second trigger to turn the tube "off" in a bistable mode. In the event that the second trigger signal is not applied within a predetermined time period, or is missing, a transistor switch circuit causes the vacuum tube switches to operate in a monostable mode to automatically turn the klystron "off."

12 Claims, 3 Drawing Figures

HIGH SPEED PULSER

BACKGROUND OF THE INVENTION

1. Field of the Invention

The subject invention relates generally to circuitry referred to as a modulator or pulser for high power microwave amplifiers and more particularly to pulsers for microwave amplifiers such as klystrons having a control grid whose input capacitance is alternately charged and discharged to turn the beam current "on" and "off."

2. Description of the Prior Art

Modulators for microwave frequency tubes are well known to those skilled in the art. For example, a discussion of the various types of modulators including line pulsing modulators and hard tube modulators is contained in Air Force Manual 52-8 entitled *Radar Circuit Analysis* at pages 11-28 through 11-35, inclusive. Additionally, a hard tube pulser for an RF klystron is disclosed in U.S. Pat. No. 3,098,980 issued to S.H.N. Doddington. The teaching of this patent discloses the charging and discharging of the klystron's input capacitance by means of a charge circuit and a discharge circuit controlled by respective multivibrators and additionally including vacuum tubes which operate as constant current devices for charging and discharging the capacitance so that a linearly rising and decreasing waveform is produced thereacross. Another example of a similar type of pulser circuit is disclosed in U.S. Pat. No. 3,274,515 issued to G.M.W. Badger. The apparatus disclosed in the Badger patent includes a pair of switch diodes operated by the voltage appearing across the secondary of the respective transformer which receive an on and off pulse for modulating the anode which in turn controls the flow of current to turn the tube on and off. A pulser circuit operable in response to the leading and trailing edge of an RF control pulse is further disclosed in U.S. Pat. No. 3,339,146 issued to A. A. Gorski, et al. Additionally, one teaching of the concept of resonantly charging and discharging the grid capacitance of a microwave tube such as a klystron is further disclosed in U.S. Pat. No. 3,636,476 issued to W.E. Milburger, the applicant of the subject invention. This last mentioned patent discloses a bistable pulser for klystrons and the like wherein a pair of cascoded transistor chains are respectively utilized as switches to alternately resonantly charge and discharge the grid capacitance of the tube for controlling te tube's conduction.

SUMMARY

Briefly, the subject invention comprises an improved pulser circuit for a pulsed electromagnetic energy transmission device such as a klystron including circuit means for providing bistable control of the conduction of the klystron by means of ON and OFF triggers applied thereto with missing OFF trigger protection, thereby providing a fail safe circuit configuration. Stated another way, under normal conditions, upon command the OFF trigger overrides the possible monostable mode to terminate the output conductivity of the klystron.

The pulser circuit configuration includes a first and a second mutually opposite conductive cascode coupled vacuum tubes coupled to the control grid of the klystron by means of an inductor or choke which is resonant with the klystron's grid capacitance. In the quiescent state, the first tube is held in a non-conductive state by means of bias voltage developed across a Zener diode whose conductivity is controlled or switched by the operation of the second tube which is normally conducting. A normally conductive transistor switch is coupled to the second conductive tube and is responsive to the first tube being driven into conduction by the ON trigger pulse to render the second tube non-conductive whereupon the Zener diode bias voltage is removed making the first tube further conductive. OFF trigger circuit means are coupled to the second tube for rendering it subsequently conductive, which in turn causes the Zener diode to reapply a bias voltage to the first tube causing it to become non-conductive once again. In the event that an OFF trigger is not applied within a predetermined time period, or is missing, the transistor switch coupled to the second tube is rendered conductive through an R-C circuit charged by means of the conductive first tube to cause the second tube to then turn on and the first tube subsequently to turn off.

The ON and OFF trigger signals are coupled to the first and second tube respectively by means of a 1:4 step-up pulse transformer whose primary consists of a single turn of insulated wire threaded through a plurality of ferrite cores. The secondary winding of the pulse transformer is comprised of four turns of wire wound on each of the cores with all secondary winding segments connected in series. Such a configuration maximizes the coupling while minimizing the leakage reactance.

DESCRIPTION OF THE PREFERRED EMBODIMENT

Figure 1:
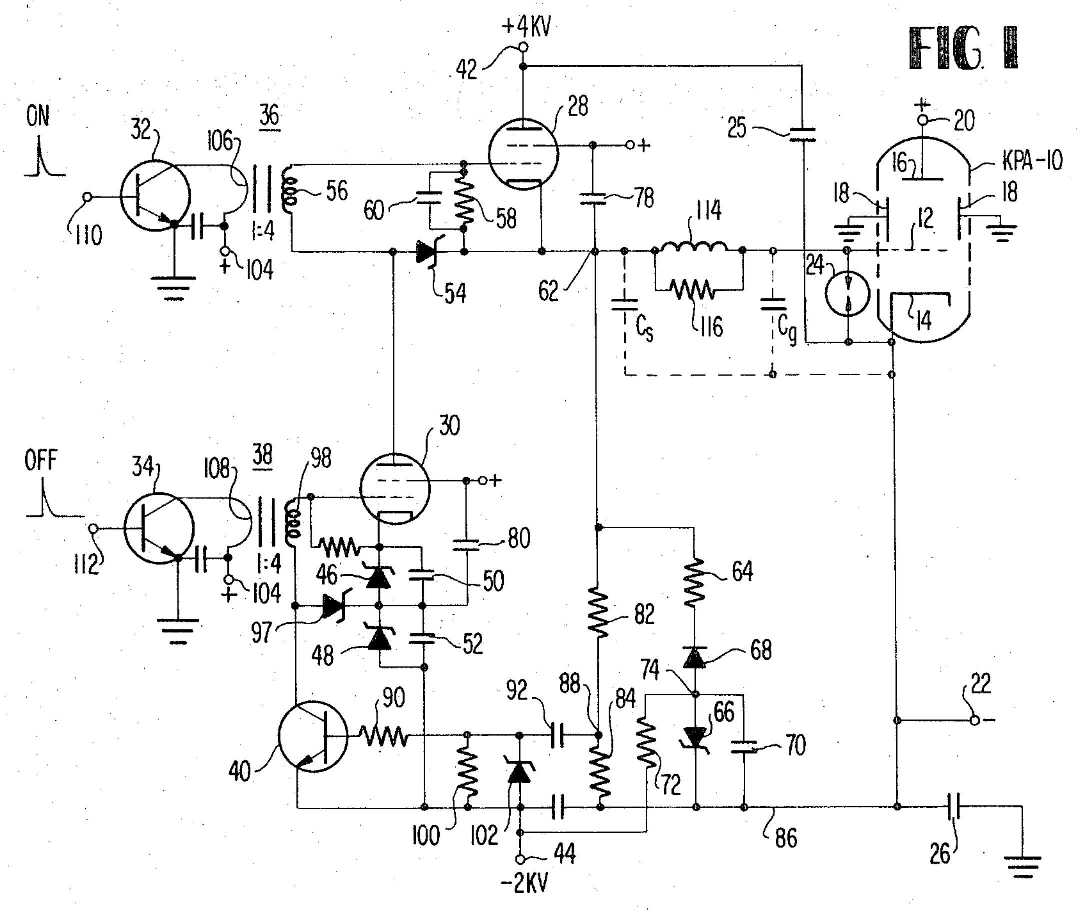
FIG. 1 is an electrical schematic diagram of the preferred embodiment of the subject invention.

Referring now to the drawings, and more particularly to FIG. 1, reference numeral 10 denotes a pulsed electromagnetic energy transmission device, and more particularly, a grid controlled klystron pulsed amplifier (KPA) having a control grid 12, a cathode 14, an anode 16 and a grounded body element 18. A high voltage supply potential is applied across the cathode 14 and the anode 16 with the positive terminal 20 thereof connected to the anode 16 and the negative terminal 22 connected to the cathode 14. A spark gap device 24 is connected between the control grid 12 and the cathode 14 for preventing harmful operating conditions from damaging the KPA 10 in a manner well known to those skilled in the art. The negative terminal 22 of the KPA supply potential has a capacitor 26 connected therefrom to a point of zero reference potential illustrated as ground to provide a filtering action of the KPA supply potential.

The subject invention is directed to the pulser circuitry for controlling the conduction of the KPA 10 at high pulse repetition frequencies. The circuitry disclosed in FIG. 1 is adapted to provide control pulses to the grid 12 of the KPA 10 having pulsewidths which vary from 200 nanoseconds ($10^{-9}$ seconds) to 200 microseconds ($10^{-6}$ seconds) through a voltage swing of −1.0 kilovolts to +4.0 kilovolts at pulse repetition frequencies (PRF) up to 100KHz.

To this end, a hybrid transistor-vacuum tube configuration is disclosed in FIG. 1, which includes, inter alia, a first and second tetrode vacuum tube operated as mutually opposite conducting switches, a pair of transistors 32 and 34 for coupling ON and OFF trigger pulses, respectively, to the vacuum tubes 28 and 30 by means of transformers 36 and 38, and a third transistor 40 whose function is to additionally control the operation of the second vacuum tube switch 30 as will be explained subsequently. The plate or anode of the tetrode vacuum tube switch 28 is connected to supply terminal 42 to which is applied a positive high voltage potential in the order of +4.0 kilovolts (4,000 volts) while the cathode of the tetrode tube switch 30 is returned to supply terminal 44 by means of a pair of series connected Zener diodes 46 and 48 and their associated parallel capacitors 50 and 52. A negative high voltage power supply potential in the order of −2.0 kilovolts is applied to terminal 44. The plate or anode of the tetrode vacuum tube switch 30 is connected to the anode of a Zener diode 54 which acts as a controlled switch for altering the grid bias applied to vacuum tube switch 28. The anode of the Zener diode 54 is also coupled to the grid of the vacuum tube 28 through the secondary winding 56 of the pulse transformer 36. The cathode of the Zener diode 54 is commonly connected to the cathode of the vacuum tube 28. A resistor 58 and capacitor 60 are coupled together in parallel across the grid and cathode of the vacuum tube switch 28. The common connection of the Zener diode and the cathode of the tetrode 28 forms a circuit junction 62. A plate load resistor 64 for the vacuum tube 30 has one side coupled to circuit junction 62 while the other side is coupled to Zener diode 66 through diode 68. A capacitor 70 is coupled across the Zener diode 66 and the combination of the Zener diode and capacitor form an anode voltage source for the tube 30 through the connection of a resistor 72 from the negative supply terminal 44 to circuit junction 74.

The screen electrodes of both vacuum tubes 28 and 30 are coupled to a suitable positive supply potential coupled to terminal 76. The respective capacitors 78 and 80 act as filter capacitors for the screen supply voltage.

A voltage divider comprised of resistors 82 and 84 are coupled from circuit junction 62 to a point of reference potential which appears at circuit buss 86 and which is also common to the KPA negative supply voltage terminal 22. The common circuit junction 88 between resistors 82 and 84 is coupled to the base of transistor 40 by means of resistor 90 and capacitor 92. The emitter of transistor 40 is connected to the negative supply terminal 44 while the collector is coupled across the Zener diode 48 by means of Zener diode 97 and to the grid of the tetrode vacuum tube 30 by means of the secondary winding 98 of the transformer 38. A resistor 100 and another Zener diode 102 are connected in parallel from negative supply voltage terminal 44 to the common connection between resistor 90 and capacitor 92.

The primary winding 106 of transformer 36 is coupled between the emitter of transistor 32 and a supply voltage terminal 104. Transistor 32 is adapted to couple the ON trigger pulse to the grid of vacuum tube switch 28 by means of transformer 36. Similarly the primary winding 108 of transformer 38 is coupled to the emitter of transistor 34 which is adapted to couple the OFF trigger pulse to the grid of vacuum tube switch 30. The ON and OFF triggers are coupled to terminals 110 and 112, respectively, which are common to the bases of transistors 32 and 34.

The vacuum tube switches 28 and 30 are coupled to the grid 12 of the KPA by means of the inductance 114 and the parallel resistor 116. Elements 114 and 116 are coupled from circuit junction 62 to the grid 12. The grid capacitance with respect to the klystron cathode is designated $C_g$ while the composite stray capacitance is designated $C_s$. The inductance 114 and resistor 116 are thus shown to isolate the grid capacitance $C_g$ and the stray capacitance $C_s$. The value of the inductance 114 is selected to resonate with the grid capacitance $C_g$ so that resonant charging and discharging of the grid capacitance will act to pulse the KPA 10 on and off respectively under the control of the vacuum tube switches 28 and 30.

Figure 2:
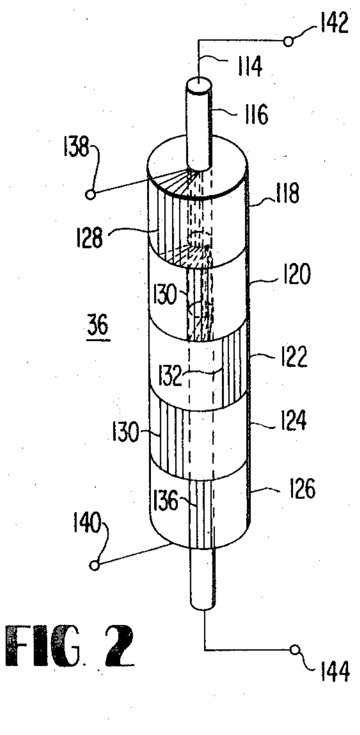
FIG. 2 is a diagram illustrative of the pulse transformer utilized by the subject invention.
Figure 3:
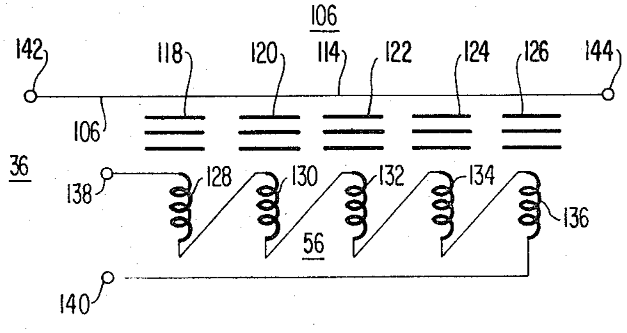
FIG. 3 is an electrical schematic diagram of the pulse transformer shown in FIG. 2.

Prior to considering the operation of the pulser circuit shown in FIG. 1, attention is now directed to FIGS. 2 and 3 which illustrate the configuration of the pulse transformers 36 and 38 utilized to couple the respective ON and OFF trigger pulses respectively to the grids of the tetrodes 28 and 30. The transformers are identical and comprise 1:4 step-up pulse transformers whose primary windings consist of a single turn. The primary winding is made up of a high voltage (20KV) insulated wire consisting of the wire 114 and its associated insulated covering 116 fed through five contiguous ferrite cores 118, 120, 122, 124 and 126. Each of the cores has four turns of triple varnished wire wound thereon making up five secondary windings segments 128, 130, 132, 134, and 136 which are connected in series to secondary output terminals 138 and 140. The single turn primary winding terminates in the terminals 142 and 144.

Considering now the operation of the subject invention, under quiescent conditions, the anode supply voltage for tube 30 appearing at circuit junction 74 appears across Zener diode 66 and is in the order of −1,200 volts which is more positive than the −2.0 kilovolts applied to terminal 44. The Zener diodes 46 and 48 connected in series to the cathode of vacuum tube switch 30 operate as two series bias voltage sources; however, the cathode side of secondary winding 98 is coupled only across Zener diode 46 which acts to bias the tube 30 on whereupon current flow through the Zener diode 54 in the anode circuit thereof causes a bias voltage to appear on the grid of vacuum tube switch 28 to hold it in a non-conductive state. The resulting potential at circuit junction 62 is then in the order of −1,000 volts which acts as a bias for the KPA grid 12 maintaining it in an off or non-conducting state. The bias conditions thus set are further established by the cathode to screen current flowing in the vacuum tubes 28 and 30.

The application of an ON trigger to terminal 110 acts to turn the KPA 10 ON while the application of the OFF trigger to terminal 112 acts to turn the KPA 10 OFF by the resonant charging and discharging of the grid capacitance $C_g$ through the choke 114. However, if the OFF trigger is missing or does not occur in a predetermined time, operation of transistor 40 will cause turn off of the KPA as will be hereinafter described. Application of an ON trigger signal to the base of transistor 30 will be coupled to the grid of the normally non-conductive switch tube 28 by means of transistor 32. As noted earlier, vacuum tube switch 28 is held off due to the bias voltage established across Zener diode 54. The ON trigger pulse applies a positive grid drive to vacuum tube switch 28 causing it to start conduction whereupon a positive going pulse appears across resistors 82 and 84 due to tube current flow of vacuum tube 28. The pulse appearing across resistor 84 is coupled by means of the capacitor 92 to the base of normally non-conducting transistor 40 by means of resistor 90 causing transistor 40 to become conductive, i.e., turn on and as such appears as a closed switch. The cathode side of secondary winding 98 now instead of being coupled to the anode of Zener diode 46 is now coupled to the anode of Zener diode 48. The additional voltage developed across Zener diode 48 and capacitor 52 now exists between the grid and cathode of vacuum tube switch 30 causing it to cease conduction. The cessation of plate or anode current in vacuum tube switch 30 causes the bias voltage developed across Zener diode 54 to disappear. Zero bias then appears on vacuum tube switch 28 causing it to conduct further or "wide open." The voltage at circuit junction 62 then swings from −1,000 volts to +4,000 volts.

Since the value of the inductance 114 is selected to resonantly charge the grid capacitance $C_g$, when the stray capacitance $C_s$ has charged up to, for example, +2,000 volts the grid capacitance $C_g$ has already reached twice that value (+4,000 volts) due to the resonant charging action turning the KPA 10 on before circuit junction 62 has reached the 4KV level. At such time as the peak charge has developed on the KPA grid 12, there is a tendency for the grid capacitance $C_g$ to dump back into the source. This action is prohibited, however, since the source continues to pump in the forward direction, that is continues to rise towards 4KV. As a result, an oscillatory wave train develops on the grid pulse if the tank circuit completed through the stray capacitance $C_s$ is not damped. In order to counteract this effect, resistor 116 is utilized as the damping resistor.

Under normal conditions, bistable operation is accomplished whereupon an OFF trigger is thereafter applied to the base of transistor 34 which in turn is coupled to the grid of the now non-conductive switch tube 30 causing it to turn on. As soon as switch tube 30 again becomes conductive, Zener diode 54 develops a bias voltage thereacross which cuts off switch tube 28. At such time a similar resonant discharging action of the grid capacitance $C_g$ occurs causing the KPA 10 to turn off. It should also be pointed out that the diode 68 coupled to the Zener diode 66 removes the negative overswing of the resonant discharge of the grid capacitance. The cosine shape of the rise and fall voltage waveform which occurs due to the resonant charging and discharging of the grid capacitance $C_g$ restricts the sideband content of the KPA rf output.

In the event that the OFF trigger is missing or is not applied within a predetermined time, the following action will occur causing the circuit to act as a monostable pulser rather than a bistable pulser as already described. In absence of an OFF trigger, capacitor 92 coupled to the base of transistor 40 charges through resistors 82 and 100 until the breakover level of Zener diode 102 is reached whereupon transistor 40 is rendered non-conductive. Thus the predetermined time limit for the monostable mode to take over is determined by the RC time constant of resistor 82 and capacitor 92 as well as the Zener level of Zener diode 102. When transistor 40 again becomes non-conductive, the vacuum tube switch 30 again becomes conductive due to the fact that transistor 40 has effectively switched out the effect of the added grid bias provided by Zener diode 48 and capacitor 52. Thus the quiescent grid bias established by Zener diode 46 and capacitor 50 is again applied to the grid of switch tube 30, causing it to become conductive as before and the resonant discharge action occurs cutting off the KPA 10. The Zener diode 47 further acts to prevent duty sensitivity of the circuit.

Thus what has been shown and described is improved pulser configuration for grid controlled klystrons and the like wherein the circuit automatically reverts to a monostable mode of operation in the event that the OFF trigger coupled to the circuit in a normal bistable mode of operation is missing. Wideband transformer design provides high voltage primary to secondary isolation for the trigger pulses. Additionally, Zener diode bias switching provides a novel means of providing mutually opposite conduction of the vacuum tube switches. Finally, resonant charge and discharge peaking provides a flexible fast rise time (in the order of 50 nanoseconds) which acts to increase the load bandwidth required for present day radar systems.

Having described what is at present considered to be the preferred embodiment of the subject invention,

We claim:

1. A pulser circuit for controlling a high frequency electromagnetic energy transmission device such as a klystron having at least one control element including an input capacitance which is adapted to be resonantly charged and discharged from a source of supply voltage, comprising, in combination:

first and second cascode coupled electronic switch means operably biased in a quiescent state to be mutually non-conductive and conductive, respectively, coupled across said source of supply voltage and including circuit means coupled to said control element of said transmission device applying a bias voltage to said control element for maintaining said device in a normally inoperative state;

bias circuit means, controlled by the conductive state of said second electronic switch means, intercoupling said first and second electronic switch means for altering the bias of said first electronic switch means for effecting mutually opposite conductive states thereof upon selective actuation of either of said switch means;

first trigger signal circuit means coupled to said first electronic switch means and being responsive to a first trigger signal externally applied to couple an actuation signal to said first electronic switch means whereupon said switch means becomes conductive to couple the positive side of said supply voltage to said control element for rendering said transmission device operative;

second trigger signal circuit means coupled to said second electronic switch means and being responsive to a second trigger signal applied subsequent to said first trigger signal to couple an actuation signal to said second switch means whereupon the previously rendered non-conductive second switch means again becomes conductive to uncouple said supply voltage from said control element thereby rendering said transmission device inoperative; and third electronic switch means, normally non-conductive, coupled to said second electronic switch means for altering the bias of said second electronic switch means and additionally including circuit means having a charging circuit coupled to said first electronic switch means, being responsive to the actuation of said first electronic switch means to cause said third electronic switch means to become conductive and alter the bias of said second electronic switch means so as to drive said second switch means into non-conduction whereupon said bias circuit means in turn alters the bias on said first switch means to cause further conduction thereof, said charging circuit being additionally operable to render said third switch means again non-conductive after a predetermined time interval in the event that said second control signal is not applied during said time interval.

2. The pulser circuit as defined in claim 1 wherein said first and second cascode coupled electronic switch means are comprised of vacuum tubes and said third electronic switch means comprises a transistor.

3. A pulser circuit as defined in claim 2 wherein said vacuum tubes include at least a cathode, a grid and an anode and wherein said bias circuit means comprises a Zener diode coupled between the grid and cathode of said first vacuum tube and a circuit connection from the anode of said second vacuum tube to one side of said Zener diode which is common to the grid of said first vacuum tube, and anode load means for said second vacuum tube coupled to the opposite side of said Zener diode means which is also common to the cathode of said first vacuum tube.

4. The apparatus as defined in claim 3 wherein said first and second vacuum tubes are comprised of tetrodes additionally including a screen, and circuit means for applying a supply potential between the screen and cathode of said first and second vacuum tube.

5. The apparatus as defined by claim 3 and additionally including a first and second Zener diode connected in series between the cathode of said second vacuum tube and the negative side of said supply voltage, and wherein said transistor is coupled across the Zener diode nearer the negative side of said supply voltage.

6. The apparatus as defined in claim 5 wherein said transistor includes a base, an emitter, and collector, and wherein said emitter and collector are coupled across said Zener diode nearer the negative side of said supply voltage and the base is connected to said charging circuit.

7. The apparatus as defined by claim 6 wherein said charging circuit comprises an R-C circuit coupled from the cathode of said first vacuum tube to the base of said transistor.

8. The pulser circuit as defined in claim 1 wherein said circuit means couple to said control element comprises an inductance selectively chosen to be resonant with the input capacitance of said control element during charging and discharging of said input capacitance.

9. The pulser circuit as defined in claim 1 wherein said first and second control signal circuit means each comprises a transistor having a base, an emitter, and collector and including circuit means for applying said first and second trigger signal selectively to the base of said transistors and transformer means coupled to each transistor having a primary and secondary circuit and additionally including circuit means coupling the primary circuit across the collector and emitter of the respective transistor and the secondary circuit respectively to the first and second electronic switch means.

10. The apparatus as defined by claim 9 wherein said transformer comprises a 1:*n* step-up pulse transformer.

11. The apparatus as defined by claim 10 wherein said pulse transformer comprises a 1:4 step-up transformer comprising a single turn primary winding, a plurality of ferrite cores juxtaposed with respect to one another and a respective plurality of secondary winding segments of *m* turns each wound on the ferrite cores and connected in series to provide a single composite secondary winding.

12. A transformer as defined by claim 11 wherein said plurality of ferrite cores comprises five cores and wherein $n = 4$ windings on each of said five cores, said single turn primary winding being fed through each of said cores.

* * * * *